United States Patent [19]

Eida et al.

[11] 4,373,954
[45] Feb. 15, 1983

[54] RECORDING LIQUID AND METHOD FOR PRODUCING THE SAME

[75] Inventors: Tsuyoshi Eida, Chiba; Yasuhiro Yano, Naka; Yohji Matsufuji, Tokyo; Masahiro Haruta, Funabashi; Tokuya Ohta, Yokohama, all of Japan

[73] Assignee: Canon Kabushiki Kaisha, Tokyo, Japan

[21] Appl. No.: 256,306

[22] Filed: Apr. 22, 1981

[51] Int. Cl.³ .......................................... C09D 11/02
[52] U.S. Cl. ........................................ 106/20; 106/22
[58] Field of Search .................................. 106/20, 22

[56] References Cited

U.S. PATENT DOCUMENTS 4,299,630 11/1981 Hwang .................................. 106/20

Primary Examiner—Lorenzo B. Hayes
Assistant Examiner—Amelia B. Yarbrough
Attorney, Agent, or Firm—Fitzpatrick, Cella, Harper & Scinto

[57] ABSTRACT

A recording liquid composed of an aqueous composition containing a water-soluble dye as the recording agent comprises a total concentration of halogen ions and acid radicals containing in said composition within the range from 0.00001 to 0.5% by weight.

16 Claims, No Drawings

RECORDING LIQUID AND METHOD FOR PRODUCING THE SAME

BACKGROUND OF THE INVENTION

1. Field of the Invention

The present invention relates to a recording liquid, generally called ink, adapted for use in writing utensils or ink jet recording apparatus, and a method for producing such recording liquid, and more particularly a recording liquid not causing clogging of the tip of such utensils or ejection orifice and a method for producing the same.

2. Description of the Prior Art

For use in writing utensils such as felt pen or fountain pen there are already known inks composed of various dyes or pigments dissolved or dispersed in liquid media such as water or organic solvents. Also the use of similar inks is already known in so-called ink jet recording in which the ink contained in a recording head is ejected from ejection orifices for recording by means of mechanical vibration by a piezoelectric element, electrostatic attractive force by a high voltage or thermal energy.

A typical ink for writing utensils or ink jet recording is basically composed of three components; a water-soluble dye, water as the solvent for said dye, and glycols for preventing evaporation. For such water-soluble dye principally employed are direct dyes and acid dyes because of satisfactory fastness and color after recording. Such dyes are originally produced for fiber dying and generally contain a considerably amount of salts such as sodium chloride, sodium sulfate or sodium acetate which are by-products of dye synthesis or are intentionally added as salting out agent, diluting agent or level dying agent.

The recording ink made of dyes containing such salts is associated with the following drawbacks. Such salts generally affect the stability of dissolution of dyes in the ink, eventually leading to the aggregation or precipitation of the dyes. Also in the ink jet recording, such salts become precipitated if the ink composition is altered by the evaporation thereof in the vicinity of the ejection orifice. These phenomena lead to the clogging of orifice, the most undesirable trouble particularly in the ink jet recording. Although there have been proposed various measures for preventing the clogging of the point of writing utensils and ejection orifices of ink jet recording apparatus, none has ever referred to the salt concentration in the ink.

The dye concentration in an ink easily inducing such clogging has to be lowered, thus giving rise to an insufficient recording density, with unsatisfactory image quality and deficient light fastness of the recorded image.

SUMMARY OF THE INVENTION

The principal object of the present invention is to provide a recording liquid not associated with the above-mentioned drawbacks, improved in stability during storage and particularly not causing the clogging in writing utensils or ink jet recording apparatus, and a method for producing such recording liquid.

The above-mentioned object is achieved according to the present invention by a recording liquid composed of an aqueous composition containing a water-soluble dye as the recording agent wherein the total concentration of halogen ions and acid radicals in said composition is within the range from 0.00001 to 0.5% by weight, and by a method of preparing an aqueous composition containing a water-soluble dye as the recording agent and removing the halogen ions and acid radicals from said compositions in such a manner that the total concentration of said halogen ions and acid radicals falls within the range from 0.00001 to 0.5% by weight.

DETAILED DESCRIPTION OF THE PREFERRED EMBODIMENTS

From the experiments and investigations conducted by the present inventors it has been discovered that an ink composition has an elevated dissolving power for dyes and scarcely causes the ejection orifice clogging even after a prolonged standing if the total concentration of the halogen ions, typically represented by chlorine ion, and the acid radicals, typically represented by sulfate radical, is located within the range from 0.00001 to 0.5% by weight. The above-mentioned total concentration of the halogen ions and acid radicals, if higher than the aforementioned upper limit, tends to cause the orifice clogging, while a total concentration lower than the above-mentioned lower limit affects the stability of dissolution of dyes to a certain extent, presumably due to a small amount of the salts performing certain contribution in preventing the association of dye molecules in the solution.

Thus the recording liquid of the present invention is a liquid composition containing water-soluble dyes dissolved in water or a water-containing mixed solvent, comprising a total concentration of the halogen (chlorine, bromine, iodine and fluorine) ions and acid radicals (for example sulfate radical, carbonate radical, acetate radical, phosphate radical, perchlorate radicals etc.) within the range from 0.00001 to 0.5% by weight.

It is also found that the aforementioned range of total concentration is preferably from 0.0001 to 0.1% by weight, and most preferably from 0.0005 to 0.05% by weight.

According to the present invention it is thus rendered possible to obtain a recording liquid which does not cause the clogging of ejection orifices in use nor the solid precipitation during storage, and is capable of providing a recorded image with a high image density, a high image quallity, and a high light fastness.

In the present invention, the total concentration of the halogen ions and acid radicals can be controlled by already known processes such as salting out, dialysis, ultrafiltration, reverse osmosis and electrodialysis, among which industrially preferred are ultrafiltration and reverse osmosis.

Chlorine ion in the ink is determined by the volhard method, in which a known excess of standard solution of silver nitrate is added to the slightly acidified (nitric acid) solution of the ink. The excess silver ion present is then back-titrated with a standard solution of potassium thiocyanate, using a few drops of ferric sulfate as indicator. The presence of a pink tint (caused by formation of ferric thiocyanate complex) indicates that the silver ions present have been removed. By observing the volumes of thiocyanate and silver nitrate solutions used, it is possible to determine the chlorine present is the unknown.

Sulfate ion in the ink is determined gravimetrically by the precipitating as $BaSO_4$.

The recording liquid of the present invention contains water as the principal liquid component, which may also be mixed with various water-soluble organic solvents. The examples of such water-soluble organic solvents are alkylalcohols with 1 to 4 carbon atoms such as methyl alcohol, ethyl alcohol, n-propyl alcohol, isopropyl alcohol, n-butyl alcohol, sec-butyl alcohol, tert-butyl alcohol, iso-butyl alcohol and the like; amides such as dimethylformamide, dimethylacetamide and the like; ketones or ketoalcohols such as acetone, diacetone-alcohol and the like; ethers such as tetrahydrofurane, dioxane and the like; polyalkylene glycols such as polyethylene glycol, polypropylene glycol and the like; alkylene glycols with 2 to 6 carbon atoms in the alkylene radical such as ethylene glycol, propylene glycol, butylene glycol, triethylene glycol, 1,2,6-hexanetriol, thiodiglycol, hexylene glycol, diethylene glycol and the like; glycerine; lower alkyl ethers of polyhydric alcohols such as ethylene glycol methyl (or ethyl) ether, diethylene glycol methyl (or ethyl) ether, triethylene glycol mono-methyl (or -ethyl) ether and the like; and N-methyl-2-pyrrolidone, and the like.

Among these water-soluble organic solvents particularly preferred are polyhydric alcohols such as diethylene glycol, and lower alkyl ethers of polyhydric alcohols such as triethylene glycol mono-methyl (or -ethyl) ether.

Such water-soluble organic solvents are added to the recording liquid in an amount, with respect to the entire weight thereof of the range from 0 to 95% by weight, preferably 10 to 80% by weight, and most preferably 20 to 50% by weight.

The water content in said recording liquid is determined within a wide range in relation to the species and composition of said organic solvents and/or to the desired characteristics of said recording liquid, and is generally within the range, with respect to the entire weight of the liquid media, from 10 to 100% by weight, preferably 10 to 70% by weight, and most preferably 20 to 70% by weight.

In the present invention there may be employed, as the recording agent, a wise variety of water-soluble dyes such as substantive dyes and acid dyes.

Such recording agent is added in an amount, with respect to the entire weight of the recording liquid, within the range from 50 to 0.5% by weight, preferably 40 to 0.5% by weight, and most preferably 30 to 1% by weight.

The recording liquid of the present invention having the aforementioned composition and a controlled total concentration of the halogen ions and acid radicals exhibits well-balanced performance with respect to the recording properties (response to signals, stability of droplet formation, stability of droplet ejection, ability for prolonged continuous recording, stability of droplet ejection after prolonged pause in recording etc.), stability in storage, fixability to the recording material, and light fastness, weather resistant properties and water resistant properties of the recorded image. In order to further improve these properties, the recording liquid of the present invention may additionally contain various additions already known in the art.

Examples of such additives are viscosity regulating agents such as polyvinyl alcohol, cellulose derivatives, water-soluble resins and the like; surface tension regulating agents such as cationic, anionic and nonionic surfactants, diethanol amine or triethanol amine, and the like; and pH control agents having buffer function.

Also in case of use in the ink jet recording wherein the droplet ejection is effected by thermal energy, the recording liquid may be subjected to the adjustment of thermal properties such as specific heat, coefficient of thermal expansion and thermal conductivity.

The present invention will now be clarified in further detail by the following examples.

EXAMPLE 1

The following components:

| Ion-exchanged water | 60 parts by weight |
|---|---|
| Diethylene glycol | 30 parts by weight |
| Dye: Sumilight Black G conc. (C.I. 35255) (Sumitono Chemical) | 10 parts by weight | were sufficiently dissolved under agitation in a container and refined, by using a polyolefin ultrafiltering membrane (NTU-2006 supplied by Nitto Denko Co.) and an ultrafiltering device (M-1 supplied by Nitto Denko Co.), by supplying ion-exchanged water of the same amount as that of the exhaust water until the concentrations of chlorine ion and sulfate radical in the recording liquid respectively reached 0.01% by weight. The obtained liquid was filtered under pressure through a Teflon filter having a pore size of 1 micron, and subsequently degassed with a vacuum pump to obtain the recording liquid, which was tested on a recording apparatus having an on-demand type recording head performing droplet ejection with a piezo-electric vibrating element (diameter of emission orifice: 50 microns, piezo-electric element driven with a voltage of 60 V and a frequency of 4 KHz).

Also a similar evaluation was conducted by use of a recording apparatus having an on-demand multi-orifice type recording head performing droplet ejection by supplying thermal energy to the recording liquid in said recording head (diameter of ejection orifices: 35 microns, heating resistors of 150 ohms, driven with a voltage of 30 V and a frequency of 2 KHz), and the recording liquid of the present example showed the following satisfactory results in both evaluations:

Stability in prolonged storage: The recording liquid, stored in a sealed glass container for 6 months at $-30°$ C. or 60° C., did not show any solid precipitate nor any change in physical properties or color:

Stability of droplet ejection: In continuous ejection for 24 hours at room temperature, 5° C. or 40° C., the recording liquid continuously provided high-quality recording:

Response of droplet ejection: In the droplet ejection at an interval of 2 seconds and after a pause for 2 months, the recording liquid provided stable and uniform recording without clogging of a tip of an orifices in either case:

Quality of recorded image: The recorded image was clear and of high density. The loss in density after exposure to indoor light for 3 months was less than 1%, and the image showed very little spreading after dipping in water for 1 minute.

REFERENCE EXAMPLE

The refining process in the Example 1 was so modified as to obtain the concentrations of chlorine ion and sulfate radical equal to 0.8 and 0.4% by weight respectively, or 0.000001 and 0.000002% by weight respectively, and the two recording liquids thus obtained were evaluated in the same manner as in the Example 1. In either case the liquid showed precipitation of the ingredients within one month of storage and often caused the clogging of a tip of an orifices during the continuous ejection or in the prolonged pause between the ejections.

EXAMPLE 2

The recording liquids of the following compositions were prepared by a similar method as described in the Example 1 with a reverse osmosis membrane (NTR-1130 supplied by Nitto Denko Co.) and evaluated as in the Example 1. The obtained recording liquids showed no precipitate or ejecting orifice clogging even after storage for 2 months and provided satisfactory results as explained in the Example 1. In the following formulations, a and b respectively stand for the contents (percent by weight) of chlorine ion and sulfate radical in the recording liquids:

2-1:
| Ion-exchanged water | 67 parts by weight |
|---|---|
| Ethylene glycol monoethylether | 25 parts by weight |
| Dye: Direct Fast Yellow 5GL | 8 parts by weight |
| (C.I. Direct Yellow 26) | |
| (a = 0.01, b = 0.005) | |

2-2:
| Ion-exchanged water | 70 parts by weight |
|---|---|
| Glycerine | 20 parts by weight |
| Dye: Direct Fast Scarlet 4BS | 10 parts by weight |
| (C.I. Direct Red 23) | |
| (a = 0.012, b = 0.035) | |

2-3:
| Ion-exchanged water | 64 parts by weight |
|---|---|
| Diethylene glycol monoethylether | 30 parts by weight |
| Dye: Sumilight Supra Turquoise Blue G conc. (Sumitono Chemical) | 6 parts by weight |
| (a = 0.012, b = 0.009) | |

2-4:
| Ion-exchanged water | 60 parts by weight |
|---|---|
| Ethylene glycol | 30 parts by weight |
| Dye: Direct Fast Black B | 10 parts by weight |
| (C.I. Direct Black 22) | |
| (a = 0.03, b = 0.01) | |

2-5:
| Ion-exchanged water | 68 parts by weight |
|---|---|
| Diethylene glycol | 25 parts by weight |
| Dye: Acid Blue Black 10B | 7 parts by weight |
| (C.I. Acid Black 1) | |
| (a = 0.028, b = 0.002) | |

2-6:
| Ion-exchanged water | 65 parts by weight |
|---|---|
| Ethylene glycol monoethylether | 27 parts by weight |
| Dye: Direct Fast Yellow 5GL | 8 parts by weight |
| (C.I. Direct Yellow 26) | |
| (a = 0.0005, b = 0.0002) | |

2-7:
| Ion-exchanged water | 60 parts by weight |
|---|---|
| Glycerine | 30 parts by weight |
| Dye: Direct Fast Scarlet 4BS | 10 parts by weight |
| (C.I. Direct Red 23) | |
| (a = 0.12, b = 0.08) | |

2-8:
| Ion-exchanged water | 74 parts by weight |
|---|---|
| Diethylene glycol monoethylether | 20 parts by weight |
| Dye: Sumilight Supra Turquoise Blue G conc. | 6 parts by weight |
| (C.I. Direct Blue 86) (Sumitomo Chemical) | |
| (a = 0.006, b = 0.0001) | |

2-9:
| Ion-exchanged water | 50 parts by weight |
|---|---|
| Ethylene glycol | 40 parts by weight |
| Dye: Direct Fast Black B | 10 parts by weight |
| (C.I. Direct Black 22) | |
| (a = 0.03, b = 0.06) | |

EXAMPLE 3

The recording liquids obtained in the Example 2 were respectively filled in felt pens, which provided smooth writing after standing for one week without caps.

What we claim is:

1. A recording liquid comprising an aqueous composition of a water-soluble dye as the recording agent, wherein said liquid has a total concentration of halogen ions and acid radicals within the range from 0.00001 to 0.5% by weight.

2. A recording liquid according to the claim 1, wherein the total concentration of the halogen ions and acid radicals is within the range from 0.0001 to 0.1% by weight.

3. A recording liquid according to the claim 1, wherein the total concentration of the halogen ions and acid radicals is within the range from 0.0005 to 0.05% by weight.

4. A recording liquid according to the claim 1, wherein said halogen ions are chlorine ion.

5. A recording liquid according to the claim 1, wherein said acid radicals are sulfate radical.

6. A recording liquid according to the claim 1, wherein said water-soluble dye is a direct dye or an acid dye.

7. A recording liquid according to the claim 1, containing a mixture of water and a water-soluble organic solvent.

8. In a method for producing recording liquid, comprising the steps of preparing an aqueous composition containing a water-soluble dye containing halogen and acid radicals in a concentration sufficient to clog an ink jet ejection orifice or writing utensil tip and to cause precipitation of said dye during storage; the improvement comprising and removing said halogen ions and acid radicals from said composition such that the total concentration of said ions and radicals is within the range from 0.00001 to 0.5% by weight.

9. A method for producing recording liquid according to the claim 8, wherein ultrafiltration or reverse osmosis is utilized for removing the halogen ions and acid radicals.

10. A method for producing recording liquid according to the claim 8, wherein salting out, dialysis or electrodialysis is utilized for removing the halogen ions and acid radicals.

11. A method for producing recording liquid according to the claim 8, wherein the halogen ions are chlorine ion.

12. A method for producing recording liquid according to the claim 8, wherein the acid radicals are sulfate radical.

13. A method for producing recording liquid according to the claim 8, wherein said water-soluble dye is a direct dye or an acid dye.

14. A method for producing recording liquid according to the claim 8, containing mixture of water and a water-soluble organic solvent.

15. A recording liquid according to claim 1 comprising an ink jet recording medium for emission from an ejection orifice.

16. A recording liquid according to claim 1 comprising an ink recording medium for dispensing from the tip of a writing utensil.

* * * * *

UNITED STATES PATENT AND TRADEMARK OFFICE
CERTIFICATE OF CORRECTION

PATENT NO. : 4,373,954

DATED : February 15, 1983

INVENTOR(S) : TSUYOSHI EIDA, ET AL.

It is certified that error appears in the above-identified patent and that said Letters Patent is hereby corrected as shown below:

Title page:

Insert: [30] Foreign Application Priority Data

May 6, 1980 [JP] Japan.....59601/1980

*Signed and Sealed this*

*Twentieth* Day of *August 1985*

[SEAL]

*Attest:*

DONALD J. QUIGG

*Attesting Officer*     *Acting Commissioner of Patents and Trademarks*